United States Patent
Jacobs et al.

(10) Patent No.: US 11,220,809 B2
(45) Date of Patent: Jan. 11, 2022

(54) SHOWER SYSTEM

(71) Applicants: Nederlandse Organisatie voor toegepast-natuurwetenschappelijk onderzoek TNO, s-Gravenhage (NL); Hametech Holding B.V., Ermelo (NL); Wilmar Holding B.V., Dronten (NL)

(72) Inventors: Peter Jacobs, Delft (NL); Richard Edward John Kemp, Leiden (NL); Erik Daniel Nennie, Delft (NL); Bert Ter Meer, Ermelo (NL); Johny Van de Koot, Doornspijk (NL); Wilhelm Hendrik Ligtermoet, Ermelo (NL)

(73) Assignees: Nederlandse Organisatie voor toegepast-natuurwetenschappelijk onderzoek TNO, 's-Gravenhage (NL); Hametech Holding B. V., Ermelo (NL); Wilmar Holding B. V., Dronten (NL)

( * ) Notice: Subject to any disclaimer, the term of this patent is extended or adjusted under 35 U.S.C. 154(b) by 65 days.

(21) Appl. No.: 16/494,129

(22) PCT Filed: Mar. 14, 2018

(86) PCT No.: PCT/NL2018/050158
§ 371 (c)(1),
(2) Date: Sep. 13, 2019

(87) PCT Pub. No.: WO2018/169394
PCT Pub. Date: Sep. 20, 2018

(65) Prior Publication Data
US 2020/0131746 A1    Apr. 30, 2020

(30) Foreign Application Priority Data
Mar. 14, 2017   (EP) .................................... 17160901

(51) Int. Cl.
  E03C 1/044   (2006.01)
  E03C 1/04    (2006.01)
  (Continued)

(52) U.S. Cl.
  CPC ............ E03C 1/0408 (2013.01); E03C 1/044 (2013.01); F28D 7/024 (2013.01); F28D 21/0012 (2013.01); E03C 2001/005 (2013.01)

(58) Field of Classification Search
  CPC ...... A47K 3/283–284; A47K 3/32–325; E03B 1/041; E03B 2001/045; E03C 1/04;
  (Continued)

(56) References Cited

U.S. PATENT DOCUMENTS 4,300,247 A    11/1981   Berg
4,372,372 A *  2/1983   Hunter ................ F28D 21/0012
                                                     165/47

(Continued)

FOREIGN PATENT DOCUMENTS

CA    2837154 A1    11/2012
CN    202420010 U    9/2012
(Continued)

OTHER PUBLICATIONS

Jul. 4, 2018, International Search Report and Written Opinion, PCT/NL2018/050158.
(Continued)

*Primary Examiner* — David P Angwin
*Assistant Examiner* — Nicholas A Ros
(74) *Attorney, Agent, or Firm* — Banner & Witcoff, Ltd.

(57) ABSTRACT

The shower system has a heat exchanger located in compartment vertically adjacent to the wall of the shower space and closed off by an openable or removable panel. The heat exchanger comprising a helically winding heat exchange conduit with successive windings around a vertical axis in
(Continued)

said compartment above the floor of the shower space. A pump coupled to the shower drain pumps warm water to a warm water feed of the heat exchanger, from where it is sprayed on a top winding of the heat exchange conduit. Tap water is fed to the shower head successively via the heat exchange conduit and a heater and/or a mixing element for mixing water from the heat exchanger with water from a supply input for external hot water.

13 Claims, 3 Drawing Sheets

(51) Int. Cl.
  *F28D 7/02* (2006.01)
  *F28D 21/00* (2006.01)
  *E03C 1/00* (2006.01)
(58) Field of Classification Search
  CPC ............ E03C 1/0408; E03C 2001/005; F24D 17/0005–001; F24D 17/0052–0057; F28D 21/0012; F28D 7/024–028; Y02A 20/148
  See application file for complete search history.

(56) References Cited

U.S. PATENT DOCUMENTS

| | | | | |
|---|---|---|---|---|
| 5,143,149 | A * | 9/1992 | Kronberg | ............ F28D 21/0012 165/300 |
| 5,321,860 | A * | 6/1994 | Steinhardt | .............. A47K 3/283 16/272 |
| 9,284,721 | B2 * | 3/2016 | Gilbert | .................. E03C 1/0408 |
| 10,648,679 | B2 * | 5/2020 | Collini | .................... E03C 1/044 |
| 2009/0300839 | A1 * | 12/2009 | Gay | ......................... E03C 1/00 4/613 |
| 2010/0139579 | A1 | 6/2010 | Su et al. | |
| 2011/0225722 | A1 * | 9/2011 | Valdenaire | ............... E03C 1/01 4/596 |
| 2014/0304908 | A1 | 10/2014 | Newman | |
| 2016/0003564 | A1 * | 1/2016 | Theberge | .................. F28D 3/04 165/104.31 |
| 2017/0074523 | A1 | 3/2017 | Collini et al. | |
| 2017/0198982 | A1 * | 7/2017 | Tornquist | .............. E03F 5/0408 |
| 2018/0127953 | A1 * | 5/2018 | Noren | ................. A47L 15/4225 |
| 2019/0316332 | A1 * | 10/2019 | Biju-Duval | ........... E03C 1/0408 |

FOREIGN PATENT DOCUMENTS

| | | | | |
|---|---|---|---|---|
| DE | 3919543 | A1 | 12/1990 | |
| DE | 202016007421 | U1 | 2/2017 | |
| EP | 2345851 | * | 7/2011 | ............ F24D 17/00 |
| EP | 2397612 | A1 | 12/2011 | |
| EP | 2404751 | A1 | 1/2012 | |
| EP | 2453194 | A1 | 5/2012 | |
| EP | 2397612 | * | 11/2013 | ............... E03C 1/04 |
| FR | 2936698 | A1 | 4/2010 | |
| JP | 59189236 | * | 10/1984 | ............ F24D 17/00 |
| JP | 2005198692 | A | 7/2005 | |
| NL | 1020068 | C1 | 8/2003 | |
| WO | 2008031139 | A1 | 3/2008 | |
| WO | 11157426 | A2 | 12/2011 | |
| WO | 2014127488 | A1 | 8/2014 | |
| WO | 15173400 | A1 | 11/2015 | |

OTHER PUBLICATIONS

L. Hua, "Heat exchanger development for waste water heat recovery", a thesis, Department of Mechanical Engineering, University of Canterbury, 2005, pp. 57,63.

Joulia SA, "Shower with heat recovery", Joulia inline Switzerland, Jan. 2016, Vers. 02, p. 10.

R. Schuitema et al., "Energy performance of a drainwater heat recovery system", paper presented at the European Conference and Cooperation Exchange on Sustainable Energy Systems 2005, Vienna, Austria, Oct. 5-8, 2005.

Sep. 22, 2016, "Samenwerkingsverband warmtewisselaar". Retrieved from http://www.hametech.nl/.

Topsector Energie, "Multifunctional Energy Efficient Shower Cabin", Accessed Oct. 14, 2019, Retrieved from https://projecten.topsectorenergie.nl/.

* cited by examiner

SHOWER SYSTEM

CROSS-REFERENCE TO RELATED APPLICATIONS

This application is a U.S. National Stage application under 35 U.S.C. § 371 of International Application PCT/NL2018/050158 (published as WO 2018/169394 A1), filed Mar. 14, 2018, which claims the benefit of priority to Application EP 17160901.9, filed Mar. 14, 2017. Benefit of the filing date of these prior applications is hereby claimed. Each of these prior applications is hereby incorporated by reference in its entirety.

FIELD OF THE INVENTION

The invention relates to a shower system.

BACKGROUND

It is known to use warm water from the drain of a shower basin to assist heating of water that is supplied to the shower head. US2010139579 discloses a water heater for a bathroom with a heat exchanger. During operation water from the shower basin is continuously pumped to the heat exchanger. Tap water enters into the heat exchanger and absorbs heat, after which it flows to a heater and from there to the shower head.

US2010139579 describes that the pump, the heat exchanger and the heater can be installed in the empty cavity located at the lower part of the base (base tub) of the bathroom, or at the position for installing which is on the side wall or on the upper part of the base behind the back wall of the bathroom.

In practice the realization of shower systems that provide for high efficiency heat recovery often requires complex installation and maintenance. As the drain water may comprise solid or solidifying material such as hair and soap, clogging of the heat exchanger often causes a need for maintenance.

EP2397612 discloses a shower system wherein functional elements of the shower system, including the siphon, a sieve and a heat exchanger, are included in a recess in the wall adjacent the shower space, or in a box in a false wall in front of the wall. The box is closed off by a front panel.

SUMMARY

Among others, it is an object to provide for a shower system that has high heat conservation efficiency and that can easily be installed and maintained.

According to one aspect a shower system is provided comprising
a shower space bordered by a wall and a floor;
a shower head above the shower space and a shower drain below the shower space;
a heater and/or a supply input for external hot water;
a compartment vertically adjacent to the wall and closed off from the shower space by an openable or removable panel;
a heat exchanger located in the compartment vertically adjacent to the wall closed off by an openable or removable panel, the heat exchanger comprising a helically winding heat exchange conduit with successive windings around a vertical axis in said compartment above the floor of the shower space, and a warm water feed configured to spray water on a top winding of the heat exchange conduit;
a pump coupled between the shower drain and the warm water feed of the heat exchanger;
a tap water input coupled to the shower head successively via the heat exchange conduit and the heater and/or a mixing element for mixing water from the heat exchanger with water from the supply input for external hot water.

Use of a helically winding heat exchange conduit provides for high efficiency. Moreover, it enables placement of the heat exchanger in a compartment adjacent a shower space. This simplifies installation and maintenance. In an embodiment, the shower space further borders on a further wall, the wall and the further wall forming a corner of the shower space, wherein the compartment bounded by the panel and parts of the first and second wall that extend from the corner. Thus, the installation requires no more space than already available for existing showers. In an embodiment, the panel may be implemented as a door to allow frequent access to the heat exchange conduit. In another embodiment the panel may coupled to the first and/or second wall via a detachable connection to allow frequent access.

In an embodiment the helically winding heat exchange conduit runs sloping upward from the tap water input to the top winding. This provides for efficient counterflow, with increasingly warmer water at increasing height in the heat exchange conduit and increasingly colder drain water at decreasing height. The drain of the heat exchanger may be located at the bottom of the compartment.

In an embodiment the heat exchanger conduit comprises a plurality of sections connected in series between the tap water input and the heater, the compartment comprising a first and second sub-compartment with a watertight separation between the first and second sub-compartment, the sections of the heat exchanger conduit being located in the first sub-compartment and connections that connect the sections in series being located in the second sub-compartment. Use of separate compartments reduces the risk that the tap water system will come into direct contact with drain water due to malfunction.

In a further embodiment the sections of the heat exchanger conduit each comprise a central tap water channel, a wall enclosing the central channel and a plurality of detection channels in the wall of heat exchanger conduit, the detection channels being open to the second sub-compartment at the connections between the sections, the central channels being connected in series in the second sub-compartment. Conduits with such detection channels are known per se. Unintended leakage can be detected from the fact that water emerges from the detection channels. By making the detection channels accessible in an isolated sub-compartment, detection is possible by checking whether water accumulated in the sub-compartment. At the same time the risk of contamination of tap water is reduced. This may be done with a heat exchanger conduit that consists of a single section. Using a plurality of sections, each with their own access to the detection channels reduces the time before leakage will become apparent.

In an embodiment the shower system comprises a warm water storage vessel, the heat exchanger conduit being coupled to the shower head via the warm water storage vessel, the heater being configured to heat the water in the warm water storage vessel. Use of a warm storage vessel makes it possible to combine with immediate production of warm water without delay with use of a low capacity heater that has only sufficient heating capacity to maintain a steady temperature.

In a further embodiment the shower system comprises a further heater, the heat exchanger conduit being coupled to the warm water storage vessel via the further heater. In this way the required heat capacity for heating in the storage vessel can be kept low. Heating in the storage vessel may be needed only during longer periods when no water flows.

In principle, the water temperature may be determined by setting the average heating power. In an embodiment a bypass water conduit is provided in parallel with the heater between the heat exchange conduit and the shower head. This makes possible to set the temperature by mixing water that was only heated in the heat exchanger with water that has additionally been heated with the heater. When the warm water storage vessel is used, the bypass water conduit may also bypass water in parallel with the warm water storage vessel. Thus the temperature of the water in the warm water storage vessel may be made higher than the shower water.

In an embodiment thermostatic mixing faucet is used with inputs coupled to the water storage vessel and the bypass, and an output coupled to the shower head. In this way the mixing faucet may allow the user to set the temperature. A standard commercially available mixing faucet may be used.

In an embodiment a pump control circuit is provided, the pump control circuit comprising a water level sensor configured to sense an indication of a water level in the drain and a control circuit coupled between the water sensor and an input of the pump for pump speed control, the control circuit being configured to increase and decrease the pump speed when the water level in the drain is above and below a reference level respectively. Pump control can be used to optimize heat recovery efficiency.

BRIEF DESCRIPTION OF THE DRAWING

These and other objects and advantageous aspects will become apparent from description of exemplary embodiment, with reference to the following figures.

DETAILED DESCRIPTION OF EXEMPLARY EMBODIMENTS

Figure 1:
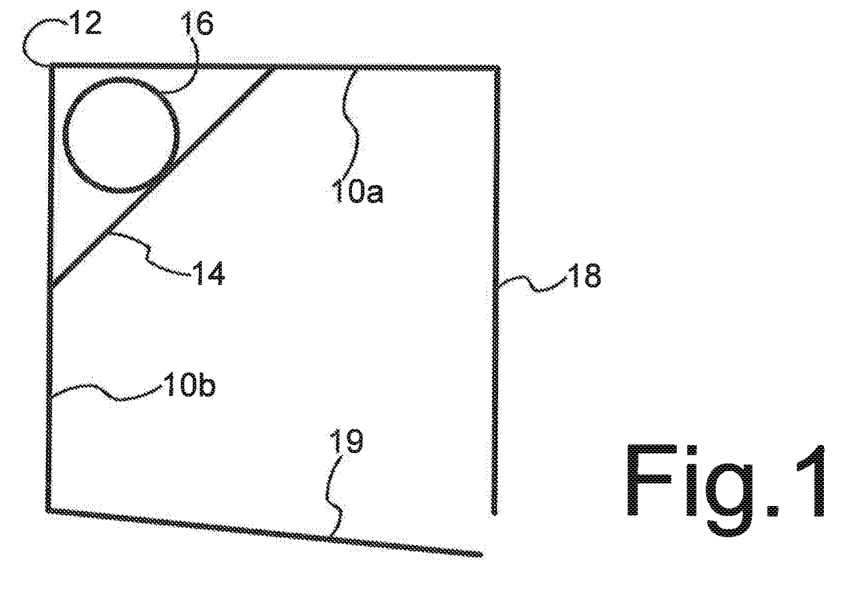
FIG. 1 shows a horizontal cross-section of a shower system.

FIG. 1 shows a horizontal cross-section of a shower system, comprising walls 10a-b, which meet in a corner 12 and a panel 14 that walls off a compartment bounded by panel 14 and parts of walls 10a,b that extend from corner 12. A helically winding heat exchanger conduit 16 is located in the compartment. By way of example, a further wall 18 and a door 19 are shown that, in combination with walls 10a-b, define a shower space with a substantially rectangular cross-section. However, further wall 18 and a door 19 need not be present, or may have a different shape. Panel 14 is preferably implemented as a further door, using a hinge that couples the further door to one of the walls 10a,b. This provides for easy access to clean the outside heat exchanger conduit 16. For example, the further door may be rotatable around a vertical hinge axis. In another embodiment, panel 14 may be coupled to the first and/or second wall via a detachable connection, e.g. hung or clipped onto supports that are attached to walls 10a,b.

Walls 10a,b and panel 14 may be part of a prefabricated shower unit, such as a shower cubicle or a corner unit for a shower space with a heater, a pump and a heat exchanger comprising helically winding heat exchanger conduit 16, or mounting position prepared for installing these components when the show system is assembled.

Figure 2:
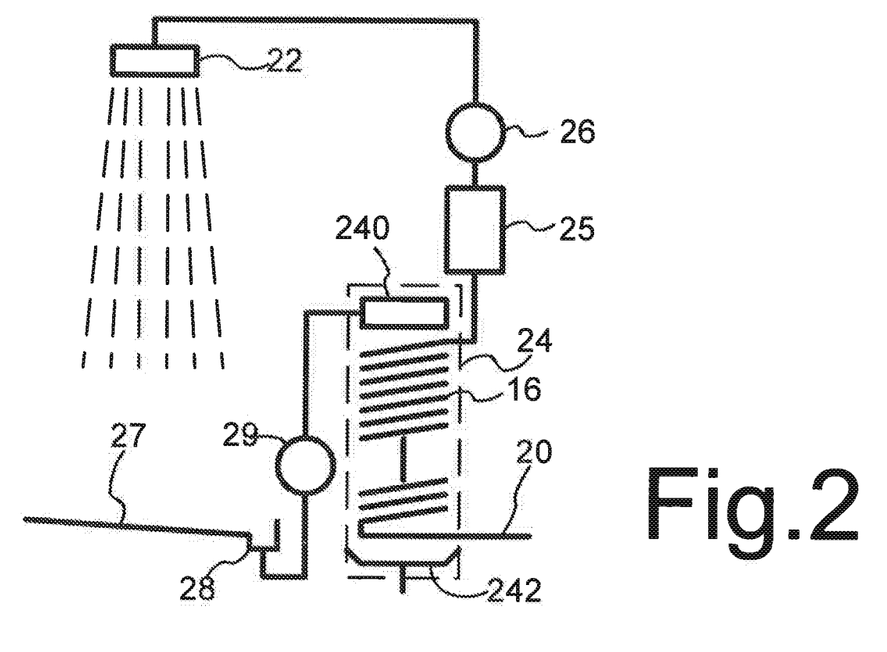
FIG. 2-4 show hydraulic circuits of the shower unit.

FIG. 2 shows a hydraulic circuit of the shower system. The shower system comprises a tap water input 20, a shower head 22, a heat exchanger 24 comprising heat exchanger conduit 16, a warm water feed 240 and a drain 242, a heater 25, a faucet 26, a base 27, a drain 28 and a pump 29. Tap water input 20 is coupled to shower head 22 via a series connection of heat exchanger conduit 16, heater 25 and faucet 26. Heat exchanger conduit 16 has a central channel through which tap water is able to flow from tap water input 20 towards shower head 22. Preferably, the channel of heat exchanger conduit 16 is at least ten meters long, and preferably more than thirty meters, although of course the space taken up by heat exchanger conduit 16 is of course much smaller because of the helical winding.

Heater 25 is located downstream from heat exchanger conduit 16 in the hydraulic circuit. Spatially, it may be located above heat exchanger 24 or next to it for example. In the illustrated embodiment, faucet 26 is located downstream from heater 25 in the hydraulic circuit, but it may be located elsewhere in the hydraulic circuit, e.g. upstream. Spatially, faucet 26 may be in any relation to heater 25. Faucet 26 and shower head 22 may be mounted on walls 10a-b, or on panel 14 for example. The floor of the shower system underneath shower head 22 is formed by base 27, which may have a tub form. Drain 28 forms an outlet from base 27. Drain 28 is coupled to warm water feed 240 via pump 29.

Heat exchanger 24 is located in the compartment formed between panel 14 and parts of walls 10a,b that extend from corner 12. Disposal of the drain water from the heat exchanger after heat exchange may be realized in any convenient way, e.g. to a sewage system or a grey water circuit or simply to the environment. The drain 242 of heat exchanger 24 is located the bottom of this compartment. Drain 242 of heat exchanger 24 comprises a reception surface for receiving drain water underneath heat exchanger 24. Drain 242 may exhaust to a grey water tank or a sewer system, preferably via a swans neck siphon. Although the drain 28 of base 27 is shown next to drain 242 of heat exchanger 24, it should be noted that drain 28 of base 27 may be located underneath the reception surface of drain 242 of heat exchanger 24. This saves floor space. Optionally, a drain pipe of drain 242 of heat exchanger 24 may run through drain 28 of base 27.

Helically winding heat exchanger conduit 16 contains a plurality of windings spiraling around a vertical axis at an upward slope. In an embodiment, water feed 240 is configured to spray water from pump 29 onto the top winding of helically winding heat exchanger conduit 16. For this purpose, water feed 240 may comprise a positioned above heat exchanger conduit 16, the head piece having a ring of nozzles that substantially corresponds to the top winding of helically winding heat exchanger conduit 16, an a feed conduit from pump 29 to the head piece. Helically winding heat exchanger conduit 16 is connected so that water flowing from tap water input 20 to shower head 22 flows upwards along the slope of the windings. Heater 25, pump 29 and heat exchanger 24 may be located in the compartment formed by panel 14 and the walls.

In operation, when faucet 26 is operated to pass water from tap water input 20 to shower head 22, water from tap water input 20 is passed to shower head 22. The water from shower head. 22 collects in base 27, from where it flows to drain 28. Pump 29 pumps the water from drain 28 to the top of heat exchanger 24, from where it flows down in thermal contact with helically winding heat exchanger conduit 16. Since the water that flows over heat exchanger conduit 16 comes from drain 28 of shower base 27, the water may contain solid material that can collect on heat exchanger conduit 16. Preferably, this is minimized by including a filter in drain 28 or between drain 28 and pump 29. But even then solid material can collect on the outer surface of heat exchanger conduit 16 over time. By implementing a panel 14 as a door that can be opened to provide access to the outer surface of heat exchanger conduit 16, or as a removable panel that can be removed to provide such access, it is made easy to remove this solid material.

Heater 25 heats the water flowing through it from tap water input 20 through heat exchanger conduit 16 and passes the heated water to shower head 22. The water pumped from drain 28 by pump 29 is still warmer than the tap water at tap water input 20, and consequently it pre-warms the tap water from tap water input 20 before it reaches heater 25. The pumped water remains in the compartment formed between panel 14 and parts of walls 10*a,b* that extend from corner 12. As the pumped water flows down in thermal contact with heat exchanger conduit 16, the vertical temperature gradients of the pumped water and the tap water in heat exchanger 24 are in the same direction, which increases heat exchange efficiency.

In an embodiment, heater 25 may be an electrically powered thermostatic heater, configured to heat the water that passes through it to at most a preset temperature. In this embodiment, shower temperature may be controlled by setting the preset temperature. The heating capacity of heater 25 affects the power supply rating needed for the heater. Reduction of the heating capacity reduces system costs. For steady state operation, it suffices that the capacity of heater 25 should be sufficient to compensate the temperature gap between the preset temperature and the steady state temperature of water from heat exchange conduit 16.

But when the heating capacity of heater 25 is smaller than needed to heat unwarmed tap water to the preset temperature, pre-warming by heat exchanger 24 will be needed to achieve the preset temperature. This has the disadvantage that it will take some time after starting the water flow before the preset temperature can be reached.

Figure 3:
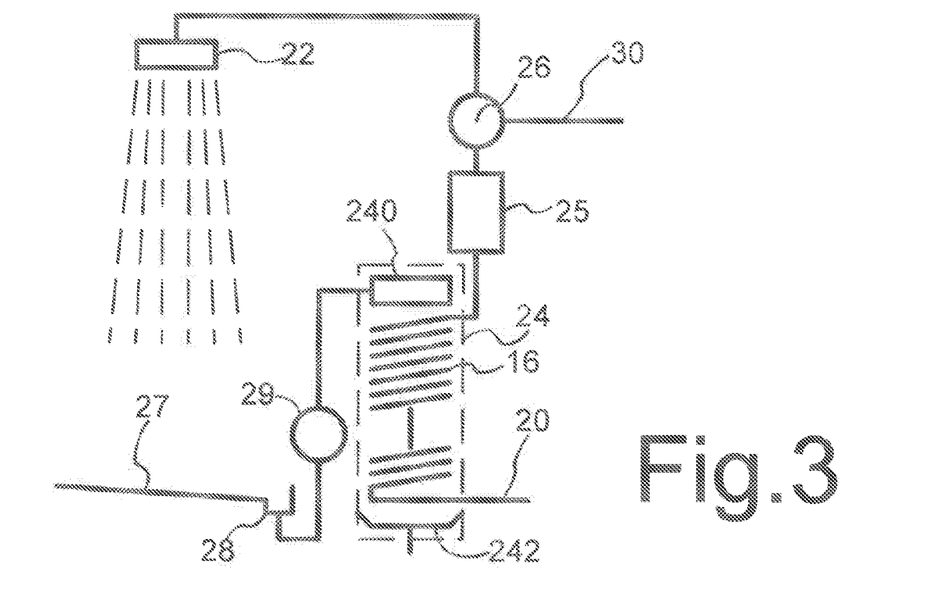

FIG. 3 shows an embodiment of the hydraulic circuit with an additional hot water input 30, e.g. from a central hot water supply. In this embodiment, faucet 26 may be a thermostatic mixing faucet 26, with inputs for receiving water from tap water input 20 via heat exchanger 24 and from hot water input 30. In operation, water from additional hot water input 30 will be used initially to ensure that water at a temperature set by faucet 26 is supplied to shower head 22. But as the tap water from tap water input 20 via heat exchanger 24 becomes warmer owing to heat exchange, less hot water from hot water input 30 will be needed.

In the illustrated embodiment, heater 25 is located in the hydraulic circuit between heat exchange conduit 16 and faucet 26, to heat water from heat exchange conduit 16. Faucet acts as a mixing element for mixing water from the heater and hot water input 30, but alternatively any type of mixing element, such as a T-piece conduit may be used.

Preferably, once heater 25 is capable of reaching the required temperature, water flow from hot water input 30 may be cut off. An exit temperature controlled mixing valve may be used in the mixing element to do so. Alternatively, rather than being cut-off, water flow from hot water input 30 may be reduced to a level at which it is detected that the mixed water has a preset temperature. In principle heater 25 could thus be omitted, the heating function being provided by mixing in water flow from hot water input 30. However, use of heater 25 reduces energy losses related to external supply of hot water.

Figure 4:
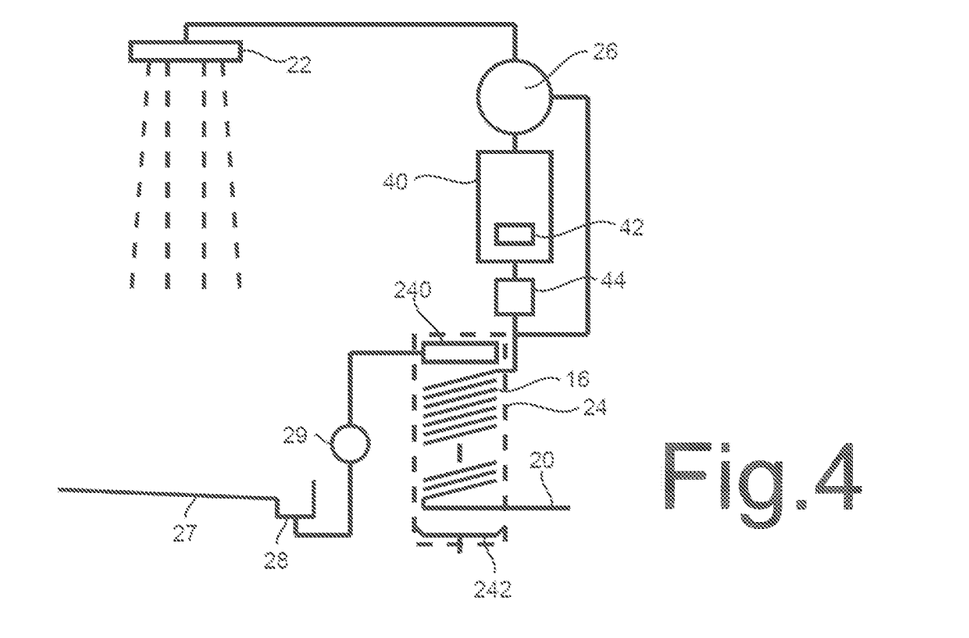

FIG. 4 shows an embodiment of the hydraulic circuit wherein delay is avoided by using a local boiler. The boiler comprises a warm water storage vessel 40 and a heater 42 in warm water storage vessel 40, e.g. at the bottom of warm water storage vessel 40, or in or on its wall. Warm water storage vessel 40 is a vessel that keeps water warm, typically it is a heat isolated water storage vessel e.g. with a heat isolating wall. Heater 42 may be a thermostatic heater, configured to heat water in warm water storage vessel 40 until a selected storage temperature above the maximum preset temperature of water from shower head 22 is reached. Warm water storage vessel 40 may be located in the compartment formed by panel 14 and the walls.

In the illustrated embodiment, the hydraulic circuit has a first and second, parallel branch between heat exchanger conduit 16 and faucet 26. The first branch comprises water storage vessel 40. The second branch bypasses water storage vessel 40. Faucet 26 is a mixing faucet, which receives both branches and mixes water from the branches, supplying the mixed water to shower head 22. Faucet 26 may be a thermostatic mixing faucet.

In operation, heater 42 heats water in water storage vessel 40 to a preset temperature when faucet 26 passes no water. When faucet 26 is operated to pass water of a preset temperature lower than the selected storage temperature to shower head 22, the water will initially be supplied partly from water storage vessel 40 and partly from heat exchanger 24 bypassing storage vessel 40, heat exchanger 24 initially supplying unwarmed water. The water from shower head 22, including water from water storage vessel 40 reaches drain 28 from where it is pumped to heat exchanger 24, where it pre-warms warms the tap water. As the water that reaches faucet 26 from heat exchange conduit 16 becomes warmer, faucet 26 will pass more and more tap water bypassing water storage vessel 40.

The debit from water storage vessel 40 is replenished with colder water from heat exchanger 24. Initially, this causes the temperature of the water in water storage vessel 40 to drop below the selected storage temperature, so that heater 42 will come into action. As the water from heat exchange conduit 16 becomes warmer less and warmer water replenishes storage vessel 40.

Heater 42 need not have the capacity to maintain the selected storage temperature immediately. Use of a low heating capacity has the advantage that a lower rated power supply circuit suffices. Preferably, it suffices that the water temperature in storage vessel 40 remains above the preset temperature. For this, the capacity of heater 42 should be sufficient to compensate the temperature gap between the preset temperature and the steady state temperature of water from heat exchange conduit 16 and the volume of storage vessel 40 should be sufficient to ensure supply of water above the preset temperature until heater 42 is able to bridge the gap between the preset temperature and the temperature of water from heat exchange conduit 16.

After faucet 26 is used to stop the water flow to shower head 22, the water in storage vessel 40 is no longer replenished and heater 42 will heat its temperature until the selected storage temperature is reached.

In a further embodiment a further heater 44 (e.g. a flow-through heater) may be added in the hydraulic circuit in series with storage vessel 40, e.g. to pre-heat or post-heat water from storage vessel 40. In this way, less heating capacity is needed in the storage vessel 40. Preferably, such a further heater is used in the first branch upstream from storage vessel 40. This ensures that warmer water is supplied to storage vessel 40.

Figure 5:
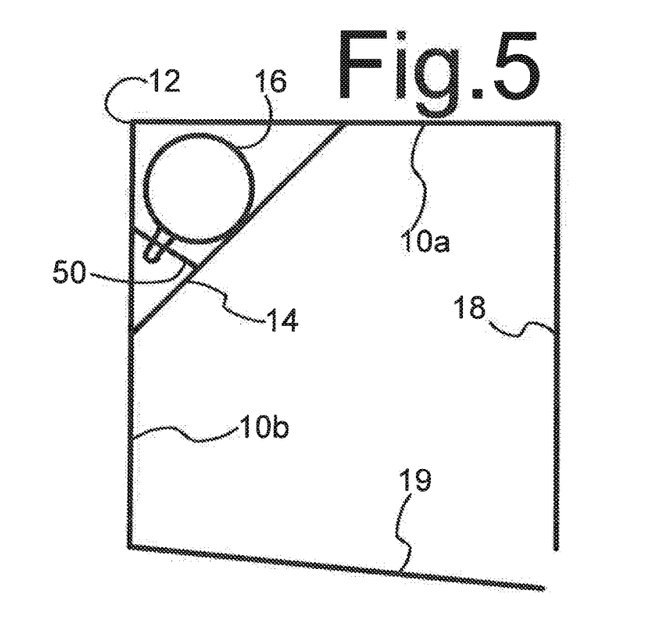
FIG. 5 shows a horizontal cross-section of a shower unit.

FIG. 5 shows a horizontal cross-section of a shower system, wherein the compartment between panel 14 and the parts of walls 10a,b comprises first and second sub-compartment with a watertight separation between first and second sub-compartment. In FIG. 5 the watertight separation comprises a further wall 50. The watertight separation is configured to keep drain water from the drain of the shower base within the first sub-compartment where this drain water exchanges heat with heat exchange conduit 16, and to keep the drain water out of the second sub-compartment. The second sub-compartment forms as "safe zone", wherein there is less risk of mixing drain water with tap water.

Figure 5A:
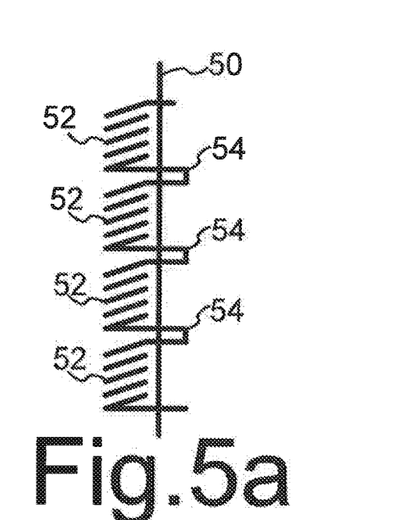
FIG. 5a shows a heat exchanger conduit with sections.

FIG. 5a shows an example wherein heat exchange conduit 16 comprises a plurality of sections 52 along its length in the first sub-compartment and with connections 54 between sections in the second sub-compartment on the opposite side of further wall 50.

In an embodiment, the wall of heat exchange conduit 16 comprises detection channels along the length of heat exchange conduit 16 in the wall of heat exchanger conduit 16 surrounding its central channel. Heat exchange conduits with such detection channels are known per se and commercially available from Wieland-Werke AG, among others. Such detection channels can be used to detect leaks. Detection channels may be protected from water inflow at the top of heat exchanger 24. When heat exchange conduit 16 is damaged, this will cause water to leak into the detection channels. The appearance of water from a detection channel can be used to detect the presence of such leaks. To do so, heat exchange conduit 16 has parts in the second sub-compartment where the detection channels have been made accessible. Heat exchange conduit 16 may comprise an outer layer and an inner layer, with the detection channels enclosed between the outer and inner layer. The detection channels can be made accessible by selectively removing the outer layer only from parts of heat exchange conduit 16 that are located in the second sub-compartment. Thus the presence of water in the second sub-compartment can be used as an indicator of damage.

To save space and improve heart contact, the detection channels are preferably quite narrow. This increases the delay before water will become apparent after damage has occurred. To reduce this time, heat exchange conduit 16 may have a plurality of sections along its length that each pass into and out of the second sub-compartment, and have part where the outer layer is removed. By way of example the central channel of each section is at most ten meters long. Four sections may be used for example. Thus even in the case of a long heat exchange conduit 16 detection with limited delay is possible.

In an embodiment, heat exchange conduit 16 may pass from the first compartment to the second sub-compartment, so that parts of heat exchange conduit 16 to which connections are made are located in the second sub-compartment. Heat exchange conduit 16 may comprise a plurality of sub-conduits coupled in series, with connections between the sub-conduits in the second sub-compartment. The ends of the sub-conduits in the second sub-compartment may be parts where detection channels are made accessible.

Figure 6:
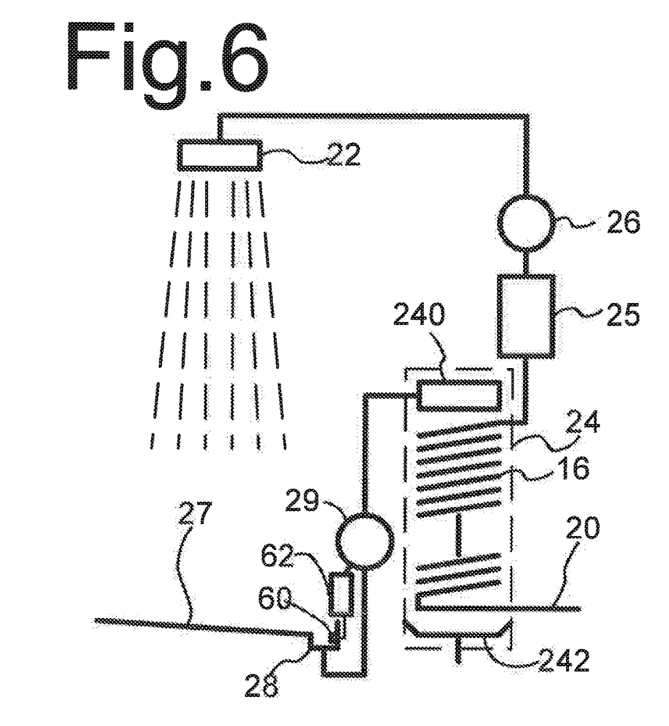
FIG. 6 shows an embodiment with a pump control circuit

FIG. 6 shows an embodiment with a pump control circuit, comprising a water sensor 60 and a control circuit 62. In an embodiment control circuit 62 comprises a micro-controller with a memory programmed with a program to make the micro-controller perform one or more of the functions described in the following. Alternatively or in addition, a hard wired circuit may be used for this purpose, the hard wired circuit comprising a feedback circuit comprising an amplifier etc. for example. Water sensor 60 is located in drain 28 and coupled to control circuit 62. Control circuit 62 is coupled to pump 29, so as to control pump speed dependent on the water level in drain 28. Control circuit 62 is configured to increase and, decrease the pump speed when the water level in the drain is above and below a predetermined reference level respectively, in an embodiment water sensor 60 may be level sensor configured to detect whether or not there is water at one or more reference levels. Alternatively, water sensor 60 may be a water pressure sensor.

The pump speed of pump 29 is preferably adjusted to adapt the flow of water from drain 28 to heat exchanger 24 to the flow of water from shower head 22. This so called balanced flow maximizes the efficiency of heat exchanger 16. It reduces loss of heat from water standing in the shower base. Furthermore, pump control may be used to avoids loss of pump effect due to excessive pump speed which may introduce air bubbles in the pump (cavitation) which makes it difficult to start pumping again even when the water level has been restored.

Control circuit 62 may be configured to control the pump speed dependent on the difference between the sensed water level and the reference level, and/or one or more binary indications that the water level is above or below one or more reference levels and/or dependent on whether water sensor 60 indicates increases or decreases in water level. Thus the control circuit 62 acts to form a feedback loop to control the water level by adjusting the pump speed. When a binary indication is used, the feedback loop may comprise an integrating feedback circuit, that is, a feedback circuit that increases and decreases the pump speed with time while the water level is above and below the reference level respectively.

The water flow through the hydraulic system is determined by the pressure drop over the system and the mains pressure. The pressure drop over the hydraulic system can change over time due to pollution such as scaling inside the heat exchanger 16. Further the mains pressure may differ between different dwellings. Also the pump 29 can pollute in time. Therefore the pump control speed control signal of control circuit 62 may need to be different in different dwellings and it may need change over time. This makes it difficult to set the pump directly at the optimal speed. Control circuit 62 may need to change the pump speed by control circuit 62 during an initial time period before balanced flow is achieved. This may reduce the heat recovery efficiency of the heat exchanger 16.

In an embodiment, this problem is solved by including a memory in control circuit 62, and configuring control circuit 62 to retain a pump speed control signal level reached before water flow is switched off in the memory when the water flow is switched off, and to set the pump speed to the retained control signal level when the water flow is switched back on. In this way, when faucet 26 is opened to the same position when the water flow is switched on the pump can be started directly with the optimal pumping speed. The memory may be implemented as a digital memory and/or a mechanical memory, such as a mechanically settable resistor of which the setting is mechanically controlled by control circuit 62 using a motor for example.

Control circuit 62 may be configured to detect switch off from the absence of water detection in a state without pumping. Similarly, control circuit 62 may be configured to detect switch on from the return of water detection after a prolonged state without pumping. Alternatively, a water flow sensor (not shown) may be included in the hydraulic circuit between the tap water input and the shower head. Control circuit 62 may coupled to such a sensor to detect switch on and switch off of the water flow. Control circuit 62 may be configured to determine the pump speed control signal level reached before water flow for example by averaging the pump speed control signal while the water flow is switched on, or by retaining a level reached at the last previous increase of the pump speed. To avoid disturbance by exceptional short water flows, control circuit 62 may be configured to disable changes of the retained level if the duration from switch on to switch-off is below a predetermined threshold of e.g. at least 10 seconds.

Preferably, drain 28 has a small volume below the level to which the feedback loop reduces the water level. For example, drain 28, which only forms part of base 27, may have an elongated cross-section with a virtual horizontal plane (e.g. when drain 28 is an elongated gutter with a bottom surface lying lower than base 27 of the shower), or a round, oval or rectangular cross section. A sieve may be provided extending horizontally in or over this cross section.

Figure 6A:
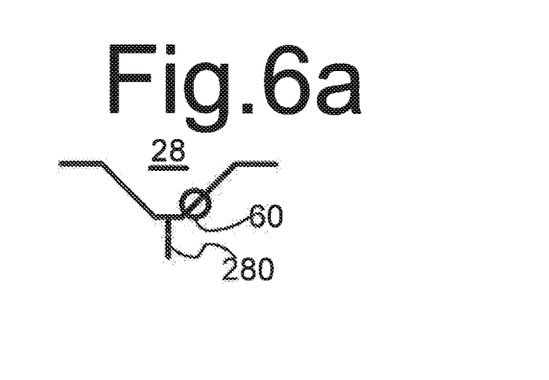
FIG. 6a shows a drain

As illustrated in FIG. 6a the drain 28 preferably has a sloping bottom surface (e.g. below the sieve), sloping downward to an outlet 280 of the drain through which water is pumped towards the pump (not shown). In an embodiment, water sensor 60 is located to sense an indication of the water level in the drain at a sensing location below at least part of the sloping bottom surface of drain 28, e.g. at the outlet 280 and/or below the sieve. Thus the feedback loop may be configured to regulate the water level to a reference level at that sensing location, the reference level lying below at least part of the bottom surface of the drain. Thus the amount of warm water that has to accumulate in the drain, before the pump can reach its regulated speed may be kept small, and heat exchange can be started soon.

In an embodiment, the amount of water pumped to warm water feed 240 of heat exchanger 14 is controlled by a system that comprises a pump with an input coupled to drain 18 of the shower base 27 and an output coupled (e.g. via T-piece) to both a bypass back to drain 28 of shower base 27 and the input of warm water feed 240 of heat exchanger 14. Furthermore, in this embodiment the system comprises a float controller valve in the bypass.

In this embodiment the pump runs constantly when the shower is used, e.g. under control of a switch. The float controlled valve is used to allow the pumped water to circulate back to drain 28 of shower base 27 as long as the water level in drain 28 has not yet reached a predetermined level. Once this level is reached, the float controlled valve closes, so that the pumped water can only flow to warm water feed 240 of heat exchanger 14.

The temperature of the shower water may be set by means of a mixing faucet and/or by setting the heating power provided by heater 25. If heater 25 is a thermostatic heater, comprising a water temperature sensor, a heating element and a feedback control loop that regulates the average heating power of the heating element to obtain a reference temperature, the temperature of the shower water may be set by setting the reference temperature. Alternatively, the heating power of the heater may be set directly by user.

In a steady state, i.e. at a steady temperature, heat exchanger 24 passes heat from the drain water to the water for the shower head with a high efficiency when substantially all water for the shower head and all drain water is passed through heat exchanger 24. This ensures a balanced heat transfer in heat exchanger 24, wherein heat from the drain water can be passed with high efficiency during steady temperature operation. As may be noted, in the illustrated embodiments the minimum shower water temperature is determined by the output temperature from heat exchanger 24. If the temperature setting is lowered suddenly, e.g. to switch to cold water, it will take some time before the temperature is fully reduced. If this delay is undesirable, a bypass conduit from the tap water input that bypasses heat exchanger 24 may be added, in combination with a mixing or switching tap, to enable mixing or switching water supply to the shower head fully or partly to tap water that has bypassed the heat exchanger 24. This enables more abrupt temperature changes.

It should be appreciated that features from the different embodiments may be combined. For example, the additional hot water input 30 may be combined with use of a warm water storage vessel, a bypass in parallel with the storage vessel and/or use of pump control. Similarly, use of a warm water storage vessel may be combined with use of pump control.

The invention claimed is:

1. A shower system comprising
a shower space bordered by a wall and a floor;
a shower head above the shower space and a shower drain below the shower space;
a heater and/or a supply input for external hot water;
a compartment vertically adjacent to the wall and closed off from the shower space by an openable or removable panel;
a heat exchanger located in the compartment vertically adjacent to the wall closed off by the openable or removable panel, the heat exchanger comprising a helically winding heat exchange conduit with successive windings around a vertical axis in said compartment above the floor of the shower space, and a warm water feed configured to spray water on a top winding of the heat exchange conduit;
a pump coupled between the shower drain and the warm water feed of the heat exchanger;
a tap water input coupled to the shower head successively via the heat exchange conduit and the heater and/or a mixing element for mixing water from the heat exchanger with water from the supply input for external hot water,
wherein the operable or removable panel, upon opening or removal, exposes an outer surface of the heat exchange conduit to the shower space, allowing for removal of solid material from said outer surface.

2. The shower system according to claim 1, wherein the shower space further borders on a further wall, the wall and the further wall forming a corner of the shower space, wherein the compartment bounded by the panel and parts of the first and second wall that extend from the corner.

3. The shower system according to claim 1, wherein a direction through the helically winding heat exchange conduit from the tap water input to the shower head runs from a lowest point of the helically winding heat exchange conduit to the top winding.

4. The shower system according to claim 1, further comprising a hinge coupling the openable or removable panel to the wall, allowing the openable or removable panel to be swung open as a door of the compartment.

5. The shower system according to claim 1, wherein the openable or removable panel is coupled to the wall via a detachable connection.

6. The shower system according to claim 1, wherein the heat exchanger conduit comprises a plurality of sections connected in series between the tap water input and the heater and/or the mixing element, the compartment comprising a first and second sub-compartment with a watertight separation between the first and second sub-compartment, the sections of the heat exchanger conduit being located in the first sub-compartment and connections that connect the sections in series being located in the second sub-compartment.

7. The shower system according to claim 6, wherein the sections of the heat exchanger conduit each comprise a central tap water channel, a wall enclosing the central channel and a plurality of detection channels in the wall of heat exchanger conduit, the detection channels being open to the second sub-compartment at the connections between the sections, the central channels being connected in series in the second sub-compartment.

8. The shower system according to claim 1, comprising a pump control circuit, the pump control circuit comprising a water level sensor configured to sense an indication of a water level in the drain and a control circuit coupled between the water sensor and an input of the pump for pump speed control, the control circuit being configured to increase and decrease the pump speed when the water level in the drain is above and below a reference level respectively.

9. The shower system according to claim 8, wherein the pump control circuit comprises a memory for storing a pump control signal level, the pump control circuit being configured to retain a pump speed control signal level setting reached before water flow is switched off in the memory when the water flow is switched off, and to set the pump speed initially to the retained control signal level setting when the water flow is switched back on.

10. The shower system according to claim 1, comprising a warm water storage vessel located in the compartment, the heat exchange conduit being coupled to the shower head via the warm water storage vessel, the heater being configured to heat the water in the warm water storage vessel.

11. The shower system according to claim 10, comprising a further heater, the heat exchange conduit being coupled to the warm water storage vessel via the further heater.

12. The shower system according to claim 10, comprising a bypass water conduit in parallel with the warm water storage vessel between the heat exchange conduit and the shower head.

13. The shower system according to claim 12, comprising a thermostatic mixing faucet with inputs coupled to the water storage vessel and the bypass, and an output coupled to the shower head.

* * * * *